(12) United States Patent
Sung (10) Patent No.: US 11,309,951 B1
(45) Date of Patent: Apr. 19, 2022

(54) BEAMFORMING MODE CONTROL BASED ON TIME ADVANCE

(71) Applicant: T-Mobile Innovations LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/333,828

(22) Filed: May 28, 2021

(51) Int. Cl.
*H04B 7/0413* (2017.01)
*H04B 7/06* (2006.01)
*H04W 56/00* (2009.01)
*H04W 72/04* (2009.01)

(52) U.S. Cl.
CPC ......... *H04B 7/0695* (2013.01); *H04B 7/0413* (2013.01); *H04W 56/0045* (2013.01); *H04W 72/0413* (2013.01)

(58) Field of Classification Search
CPC . H04W 76/27; H04W 72/0413; H04W 76/11; H04W 56/0045; H04B 7/0695; H04B 7/0413; H04B 7/0617
See application file for complete search history.

(56) References Cited

U.S. PATENT DOCUMENTS

2021/0120592 A1* 4/2021 Takahashi ............. H04L 5/0053

* cited by examiner

*Primary Examiner* — Rahel Guarino (57) ABSTRACT

Systems and methods provided for controlling a beam emitted from at least one antenna include a user device and a cell site. The cell site includes a beam management system communicatively coupled to the user device. The beam management system is structured to receive an uplink allocation request corresponding to a user device, store a time advance and an identification of a response to the uplink allocation request, determine a time advance group for the user device based on the stored time advance, store the time advance and a cell identifier based on the time advance group, determine a beam mode structured to selectively communicate with the one or more user devices according to the time advance group, and activate the beam mode for communication with the one or more user devices of the time advance group.

20 Claims, 5 Drawing Sheets

FIG. 5

BEAMFORMING MODE CONTROL BASED ON TIME ADVANCE

SUMMARY

The present disclosure is directed, in part, to controlling a beam emitted from at least one antenna at a cell site, substantially as shown in and/or described in connection with at least one of the figures, and as set forth more completely in the claims.

In aspects set forth herein, a determination of a beam mode (e.g., beamforming mode) that selectively communicates with the one or more user devices is made and the beam mode is activated for communication with the user device(s) of a time advance group. Typically, a beam is emitted from an antenna at a cell site. A signal is then spread in all directions from the antenna. In analog beamforming, analog signals are phase-shifted, summed, and then digitized to produce a directional signal. However, here, a beam mode is controlled based on a time advance. The controlled beam mode causes an antenna radiation pattern that is directed to the user device which improves performance and network efficiencies and reduces the energy wasted by directing the beam to the user device(s) associated with the time advance group.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for controlling a beam emitted from at least one antenna at a cell site of a telecommunication network (e.g., a 5G network or any other suitable network). An uplink allocation request corresponding to a user device is received. A time advance and an identification of a response to the uplink allocation request is stored. The determination of a time advance group for the user device is based on the stored time advance. The time advance and a cell identifier is stored based on the time advance group determined. A beam mode structured to selectively communicate with the user device is determined according to the time advance group. The beam mode is activated for communication with the user device of the time advance group, which activates the most suitable beam mode (e.g., beamforming mode) for communication with the user device and increases performance synergy by using a beam mode for a geographic area (e.g., the same cell coverage area).

Advantageously, providing methods and systems for controlling a beam emitted from at least one antenna at a cell site of a telecommunication network (e.g., a 5G network) by utilizing a time advance to adapt the beam mode for a served user device improves the user device performance and network efficiencies while reducing the energy wasted.

In one aspect, a method is provided for controlling a beam emitted from at least one antenna at a cell site. The method includes receiving, by a beam management system communicatively coupled to one or more user devices, an uplink allocation request corresponding to a user device. The method also includes storing a time advance and an identification of a response to the uplink allocation request, the time advance corresponding to a distance between the user device and the cell site. The method further includes determining a time advance group for the user device based on the stored time advance. The method further includes storing the time advance and a cell identifier based on the time advance group. The method further includes determining a beam mode structured to selectively communicate with the one or more user devices according to the time advance group. The method also includes activating the beam mode for communication with the one or more user devices of the time advance group.

In another aspect, a computer-readable storage media having computer-executable instructions embodied thereon is provided that, when executed by one or more processors, cause the processors to perform various steps. The processors are caused to receive, by a beam management system communicatively coupled to one or more user devices, an uplink allocation request corresponding to the one or more user devices. The processors are also caused to store a plurality of time advances and a plurality of identifiers of responses to the uplink allocation request, the plurality of time advances correspond to at least one distance between the one or more user devices and the cell site. The processors are further caused to determine at least one time advance group for the one or more user devices based on the stored plurality of time advances. The processors are further caused to store the plurality of time advances and a plurality of cell identifiers based on the at least one time advance group. The processors are further caused to determine a beam mode structured to selectively communicate with the one or more user devices according to the at least one time advance group. The processors are further caused to activate the beam mode for communication with the one or more user devices of the at least one time advance group.

In yet another aspect, a system is provided for controlling a beam emitted from at least one antenna at a cell site. The system includes a user device and a cell site comprising a beam management system communicatively coupled to the user device. The beam management system receives an uplink allocation request corresponding to a user device. The beam management system also stores a time advance and an identification of a response to the uplink allocation request. The time advance corresponds to a distance between the user device and the cell site. The beam management system determines a time advance group for the user device based on the stored time advance. The beam management system stores the time advance and a cell identifier based on the time advance group. The beam management system further determines a beam mode structured to selectively communicate with the one or more user devices according to the time advance group. The beam management system further activates the beam mode for communication with the one or more user devices of the time advance group.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
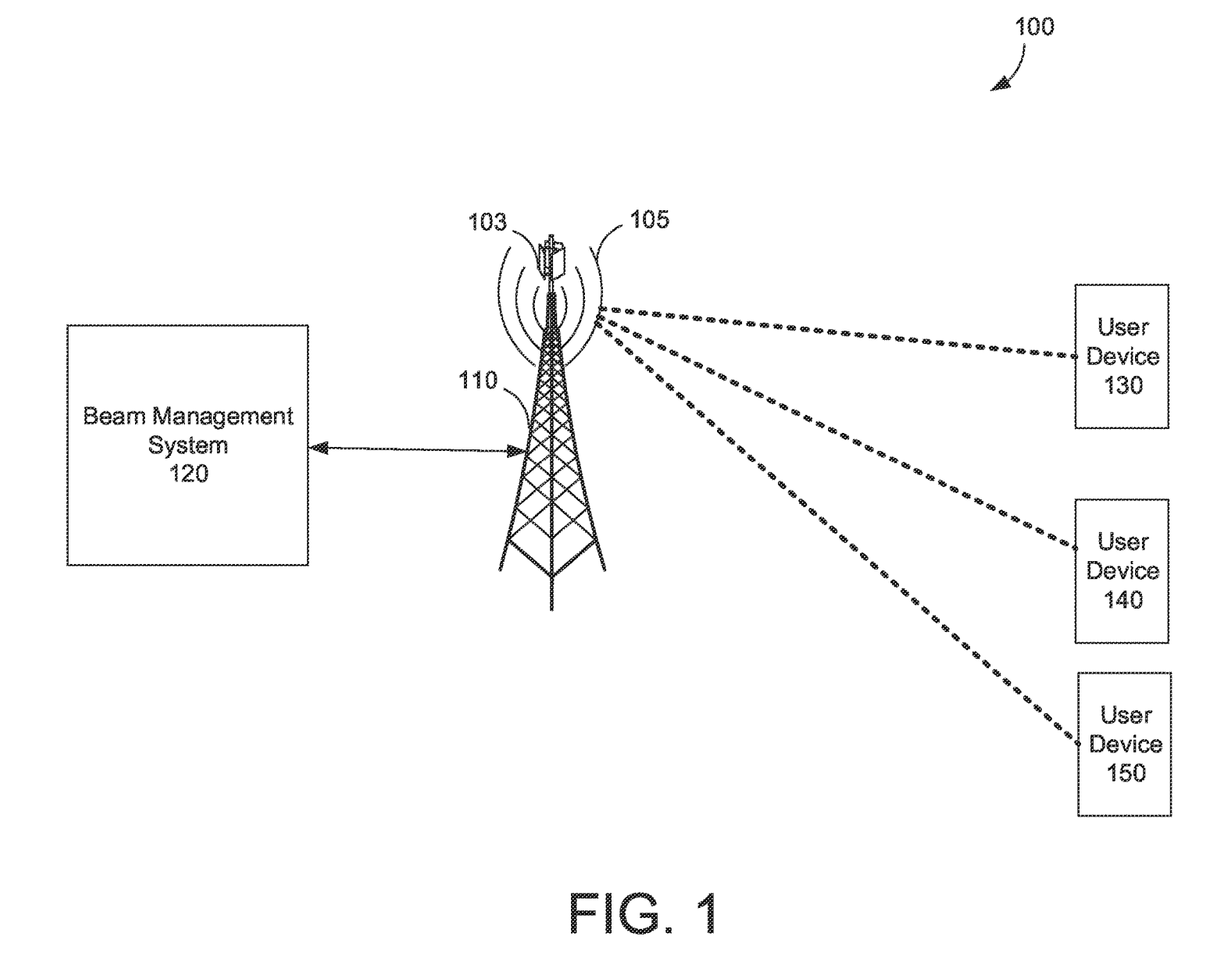
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 130, 140, and 150. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 103, base transmitter stations, radios, transmitter/receivers, digital signal processors, control electronics, GPS equipment, power cabinets or power supply, base stations, charging stations, etc. such that the cell site 110 may provide a communication link between the one or more user devices 130, 140, and 150 and other components, systems, equipment, and/or devices of the network environment 100. The base station and/or a computing device (e.g., whether local or remote) associated with the base station may manage or otherwise control the operations of components of the cell site 110.

The one or more antennas 103 may emit a beam 105 that may cover a geographic area. The one or more antennas 103 are capable of using beamforming as at least one signal processing operation (e.g., technique). The beam 105 is operable in one or more beam modes. The one or more beam modes may be controlled based on a time advance as described herein.

In a stand alone mode, the network environment 100 may take the form of a 5G network or any other suitable network. In some embodiments, the cell site 110 may be operable in a non-stand alone mode.

In the non-stand alone (NSA) mode, the network environment 100 may take the form of, for example, an E-UTRAN New Radio-Dual Connectivity (EN-DC) network. In an EN-DC network, a user device (e.g., the user device 130, 140, and/or 150) may connect to or otherwise access a 4G, LTE, 5G, 5G NR, or any other suitable network simultaneously.

In some embodiments, the network environment 100 may include a beam management system (e.g., the beam management system 120). The beam management system may include one or more nodes communicatively coupled to the user device(s) 130, 140, and/or 150 such that the beam management system may be transmit to and receive requests and/or data from one or more user devices. The one or more nodes may include a Next Generation Node B (e.g., gNodeB or gNB) or any other suitable node structured to communicatively couple to the user device(s) 130, 140, and/or 150. The one or more nodes may correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range.

In some embodiments, the user device 130, 140, and/or 150 may take the form of a wireless or mobile device capable of communication via the network environment 100. For example, the user device 130 may take the form of a mobile device capable of communication via a telecommunication network such as, but not limited to, a wireless telecommunication network. In this regard, the user device may be any mobile computing device that communicates by way of a network, for example, a 3G, CDMA, 4G, LTE, WiMAX, 5G or any other type of network.

In some embodiments, the network environment 100 may be structured to connect subscribers to a service provider or a plurality of service providers. Alternatively or additionally, the network environment 100 may be associated with a specific telecommunication provider that provides services (e.g. 5G, voice, location, etc.) to one or more user devices 130, 140, and/or 150. For example, the user devices 130, 140, and 150 may be subscribers to a telecommunication service provider, in which the user devices 130, 140, and 150 are registered or subscribed to receive voice and data services over the network environment 100. The network environment 100 may include any communication network providing voice and/or data service(s), such as, for example, a 1x circuit voice, a 3G network (e.g., CDMA, CDMA 2000, WCDMA, GSM, UMTS, a 4G network (LTE, WiMAX, HSDPA), or a 5G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
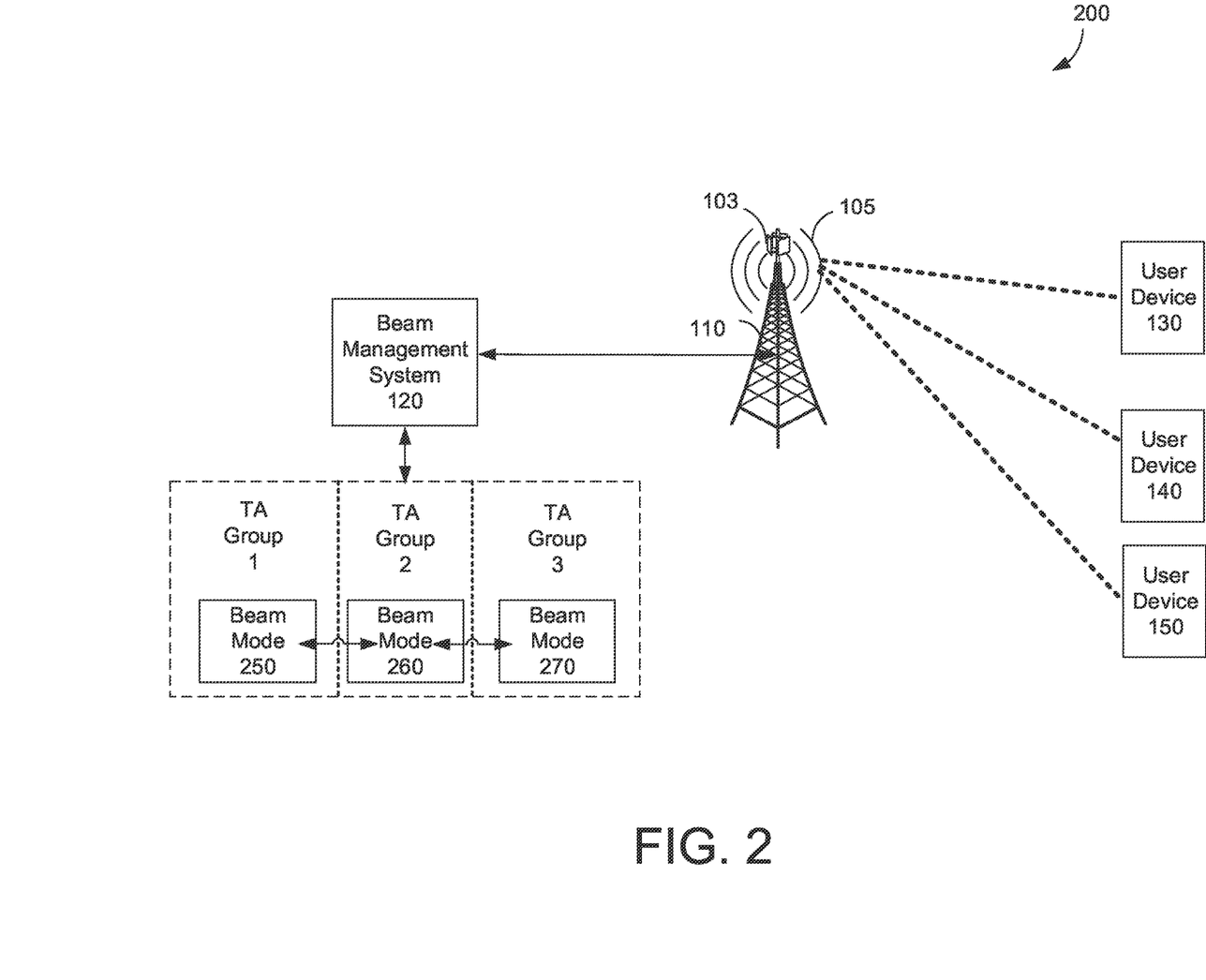
FIG. 2 is a diagram of a network environment including a cell site and a beam management system in accordance with an example embodiment.

FIG. 2 is a diagram of the network environment 200 (e.g., a telecommunication network such as, but not limited to, a wireless telecommunication network) including a cell site and a beam management system according to an example embodiment. In the present embodiment, the network environment 200 includes the antenna 103, beam 105, cell site 110, beam management system 120, one or more user devices 130, 140, and 150, one or more time advance groups 210, 220, and 230, and one or more beam modes 250, 260, and 270. Although some of the components in the network environment 200 are depicted as single components (e.g., a single antenna, cell site, beam, or beam management system), in some embodiments, the network environment 200 may include a plurality of such components from 1 to N.

The beam management system 120 may include one or more nodes. For example, the beam management system 120 may include or otherwise take the form of a 5G massive MIMO capable gNodeB (e.g., the gNodeB is communicatively coupled to an antenna structured for massive multiple-input and multiple-output (mMIMO)). In some embodiments, the beam management system 120 may be included within the cell site 110, external to the cell site 110, or otherwise communicatively coupled to the cell site 110. The beam management system 120 may allocate radio frequency, or a portion thereof, to user device(s). In further embodiments, the beam management system 120 may be structured to manage the operation (e.g., the Multiple-Input Multiple-Output (MIMO) operation, massive MIMO operation, etc.) of one or more antennas (e.g., the antenna 103). The one or more antennas 103 may emit the beam 105 is operable in one or more beam modes. The one or more beam modes may be controlled based on a time advance as described herein such that the one or more beam modes provide benefits that are received at the user device(s) 130, 140, and 150.

Alternatively or additionally, the beam management system 120 may manage the signaling (e.g., Orthogonal Frequency-Division Multiplexing (OFDM) signaling) within the network 200. The beam management system 120 may manage a Radio Access Network (RAN) or any other suitable network.

In some embodiments, the beam management system 120 (e.g., a gNodeB or gNB) may receive an uplink allocation request corresponding to a user device (e.g., the user device 130). As used herein, the term "uplink allocation request" may be used to refer to a physical random access channel (PRACH) request or any other suitable request. When the user device moves from an idle state to an active state (e.g., a Radio Resource Control (RRC) active state), the user device may send or otherwise provide the uplink allocation request to the beam management system 120. For example, when the user device 130 moves from a RRC inactive state (e.g., a RRC idle state) to a RRC active state, the user device 130 sends or provides a PRACH request to the beam management system 120. In turn, the beam management system 120 may receive or otherwise retrieve the uplink allocation request from the user device 130. The beam management system 120 may be communicatively coupled to one or more user devices such that the beam management system 120 may receive an uplink allocation request corresponding to the one or more user devices (e.g., the user devices 130, 140, and 150) or any user device within a geographic area.

In some embodiments, the beam management system 120, may be structured to provide a time advance notification to the one or more user devices in response to the received uplink allocation request. The time advance notification may include a time advance such as, but not limited to, a command from the beam management system 120 to the user device that enables the user device to adjust its uplink transmission.

In some examples, the beam management system 120 may store a time advance and an identification of the response to the uplink allocation request. Alternatively or additionally, the beam management system 120 may store a plurality of time advances and/or a plurality of identifiers of responses to one or more uplink allocation requests. As used herein the term "time advance" (TA) may be used to refer to a distance between a user device (e.g., the user device(s) 130, 140, and/or 150) and a cell site (e.g., the cell site 110). Advantageously, the beam management system 120 may control or otherwise adapt the beam mode (e.g., beamforming mode) for a served user device by utilizing the time advance (e.g., the timing advance information, distance, etc.).

In some embodiments, the identification of the response to the uplink allocation request may include a Random Access Radio Network Temporary Identifier (RA-RNTI) such that the beam management system 120 may store the time advance and the identification of the response to the uplink allocation request (e.g., may store TA and RA-RNTI in the downlink) in memory, a scheduler (e.g., a scheduling unit and/or scheduling circuitry), or in any other suitable system, component, device, etc. In some embodiments, the time advance and/or the identification of the response to the uplink allocation request may be stored within the beam management system 120, external to beam management system 120, or otherwise may be communicatively coupled to the beam management system 120. The time advance and/or the identification of the response to the uplink allocation request may be stored temporarily, simultaneously, or in any order.

In some embodiments, the beam management system 120 (e.g., the gNodeB) may determine a time advance group for the user device based on the stored time advance. For example, the gNodeB may determine a single time advance group (e.g., TA Group 1) for the user device based on the stored time advance. The beam management system 120 (e.g., the gNodeB) may determine the time advance group by measuring the time advance (e.g., a time advance value) of the user device. In some embodiments, the beam management system 120 may measure the time advance in response to the received uplink allocation request that corresponds to the user device. For example, the uplink allocation request (e.g., a PRACH signal) may be provided or otherwise transmitted from the user device for the purpose of uplink synchronization with the beam management system 120 (e.g., the gNodeB). In some embodiments, the beam management system 120 may perform the correlation on the received uplink allocation request (e.g., a PRACH signal) with a bank of preamble sequences. Among a bank of correlators, the output of the correlator that matches the received PRACH preamble may peak in the amplitude shifted in time corresponding to the roundtrip propagation delay based on the distance between the beam management system 120 (e.g., the gNodeB) and the user device. The amount or value of the time shift is the time advance (e.g., a time advance value).

In some examples, the beam management system 120 may determine at least one time advance group for one or more user devices based on a stored plurality of time advances. In this regard, the gNodeB may determine a plurality of time advance groups (e.g., TA Group 1, TA Group 2, and TA Group 3). The plurality of time advance groups of the user device(s) (e.g., 5G served user devices) and the beam management system (e.g., 5G gNodeB) provide the capability to activate or otherwise control different beam mode(s) (e.g., beamforming operations (e.g., techniques)) for each respective time advance group. This results in providing the best beam mode(s) to the user device(s) and generating performance synergies by using the determined beam mode(s) over a geographic area (e.g., cell coverage area).

The beam management system 102 may replace the identification of the response to the uplink allocation request with a cell identifier. The cell identifier may include a Cell Radio Network Temporary Identifier (C-RNTI) which is a unique user device identification that is used as an identifier of the Radio Resource Control (RRC) Connection. In some embodiments, the cell identifier may be used for scheduling. Continuing with the above example, the beam management system 102 may replace RA-RNTI with C-RNTI.

In some embodiments, the beam management system 120 may store the time advance and the cell identifier based on the time advance group (e.g., TA Group 1, TA Group 2, and TA Group 3). In further examples, a plurality of time advances and a plurality of cell identifiers may be stored by the beam management system 120 based on at least one time advance group. The time advance, the cell identifier, and/or the time advance group may be stored within the beam management system 120, external to beam management system 120, or otherwise may be communicatively coupled to the beam management system 120. The beam management system 120 may store, for example, the TA and the C-RNTI in memory, a scheduler (e.g., a scheduling unit and/or scheduling circuitry), or in any other suitable system, component, device, etc., based on the time advance group. In the example above, the TA Group 1 may include {C-RNTI/TA 1 . . . }, TA Group 2 may include {C-RNTI/TA 2 . . . }, and TA Group 3 may include {C-RNTI/TA 3 . . . }, etc.

In some embodiments, the beam management system 120 may determine a beam mode (e.g., the beam mode 250) structured to selectively communicate with the one or more user devices according to at least one time advance group. As used herein, the term "beam mode" may include a channel reciprocity mode, codebook mode, interference reduction mode, beamsweeping mode, or a combination thereof. In some examples, a plurality of beam modes (e.g., the beam mode 250, 260, and 270) may communicate with the one or more user devices (e.g., user device 130, 140, and 150) according to a plurality of time advance groups (e.g., TA Group 1, 2, and 3). In the interference reduction mode, for example, the beam management system 120 may prefer to provide link reliable, interference reducing beam operations (e.g., techniques) to a served user device located in a geographic area (e.g., located within a cell boundary and/or at the edge of a cell boundary). Advantageously, the provision of link reliable, interference reducing beam operations via the interference reduction mode optimizes or otherwise increases the user data rate. Alternatively or additionally, the beam management system 120 may prefer the channel reciprocity mode, the code book mode, or any other suitable mode to provide data operations (e.g., techniques) to a served user device located in a geographic area that result in higher data rates.

In embodiments wherein the beam mode is based on the channel reciprocity mode (e.g., channel reciprocity beamforming), the band support may take the form of Time Division Duplex (TDD). The user device(s) may provide request(s), data, and/or feedback to the beam management system 120 by an uplink sounding reference signal (UL SRS), uplink demodulation reference signal (UL DMRS), and/or any other suitable signal. In some embodiments, the beam mode (e.g., the channel reciprocity mode) may cause the beam 105 (e.g., the service beam pattern shape) to take the form of an adaptive beam (e.g., a beam derived from or otherwise based on adaptive spatial signal processing) or any other suitable beam. The operation coverage may include channel state information (CSI) coverage. For example, the operation coverage may include UL SRS coverage (e.g., UL SRS transmission).

In embodiments wherein the beam mode is based on the codebook mode (e.g., codebook beamforming), the band support may take the form of TDD, Frequency Division Duplex (FDD), or any other suitable spectrum technique. The user device(s) may provide a request, data, and/or feedback to the beam management system 120 by a channel-state information reference signal (CSI-RS) precoding matrix indicator (PMI) report, or any other suitable signal, indicator, or report. The beam mode (e.g., the codebook mode) may cause the beam 105 (e.g., the service beam pattern shape) to take the form of a 2-D DFT beam (e.g., a beam derived from or otherwise based on a 2D-Discrete Fourier transform) or any other suitable beam. The operation coverage may include channel state information (CSI) coverage based on, for example, the CSI-RS PMI report.

In embodiments wherein the beam mode is based on the beamsweeping mode (e.g., beamsweeping beamforming), the band support may take the form of TDD, FDD, or any other suitable spectrum technique. The user device(s) may provide/request data and/or feedback to the beam management system 120 based on a synchronization signal block beam (SSB) index report, a CSI-RS beam index report, or any other suitable signal, indicator, or report. The beam mode (e.g., the beamsweeping mode) may cause the beam 105 (e.g., the service beam pattern shape) to take the form of a set of pre-defined beams, directional beams, and/or any other suitable beam. The operation coverage may be based on a SSB power measurement and/or SSB power report.

Beamforming may generate or otherwise provide spatially orthogonal (e.g., separated) transmission such that the data stream of a user device may be separate from the data stream of other user device(s) at the receiver of each respective user device. Accordingly, each data stream may be assigned by a separate beam pattern for transmission. In some embodiments, the service beam mapping (e.g., 4×4

MIMO or any other MIMO capable of a plurality of layers of simultaneous data streaming transmission utilizing the same frequency resource(s)) may include a first data stream and a second data stream that may be transmitted by the same beam pattern index (e.g., same beam pattern index 1) with different polarization.

In some embodiments, the beam management system 120 may activate the beam mode for communication with one or more user devices of the time advance group(s). Accordingly, the beam management system 120 may move the beam mode from an inactive beam state to an active beam state responsive to the determination of the beam mode structured to selectively communicate with the user device(s) according to at least one time advance group. In some examples, the beam management system 120 may switch a beam mode per user device based on the time advance group. For example, the beam management system 120 (e.g., a 5G massive MIMO capable gNodeB) may switch the beam mode per user device based on a time advice group identifier (e.g., a time advance group identification number). The beam management system 120 may switch between a plurality of beam modes 250, 260, 270 such that the beam management system 120 may switch between the channel reciprocity mode, codebook mode, interference reduction mode, or any other suitable beam mode that may be applied to the user device(s) corresponding to the time advance group(s). The activation of a beam mode may occur responsive to the movement of the user device(s) across a geographic area as the time advance (e.g., the distance between the user device(s) and the cell site 110) changes from a first location to a second location up to N locations within or near a geographic region.

In some embodiments, the beam mode may be activated for communication with one or more user devices simultaneously. For example, the beam mode may apply the beam 105 to different user devices simultaneously in real-time or near real-time.

Advantageously, activating the beam mode for communication with one or more user devices of one or more time advance group(s) reduces the energy wasted by directing a beam to the user device(s) 130, 140, and 150 associated with the time advance group. The controlled beam 105 forms or otherwise causes an antenna radiation pattern that is directed to the user device(s). Further, the utilization of the time advance to control the beam mode used enables the beam management system 120 to radiate the total energy, partial energy, or avoid the use of the energy of a beam.

Figure 3:
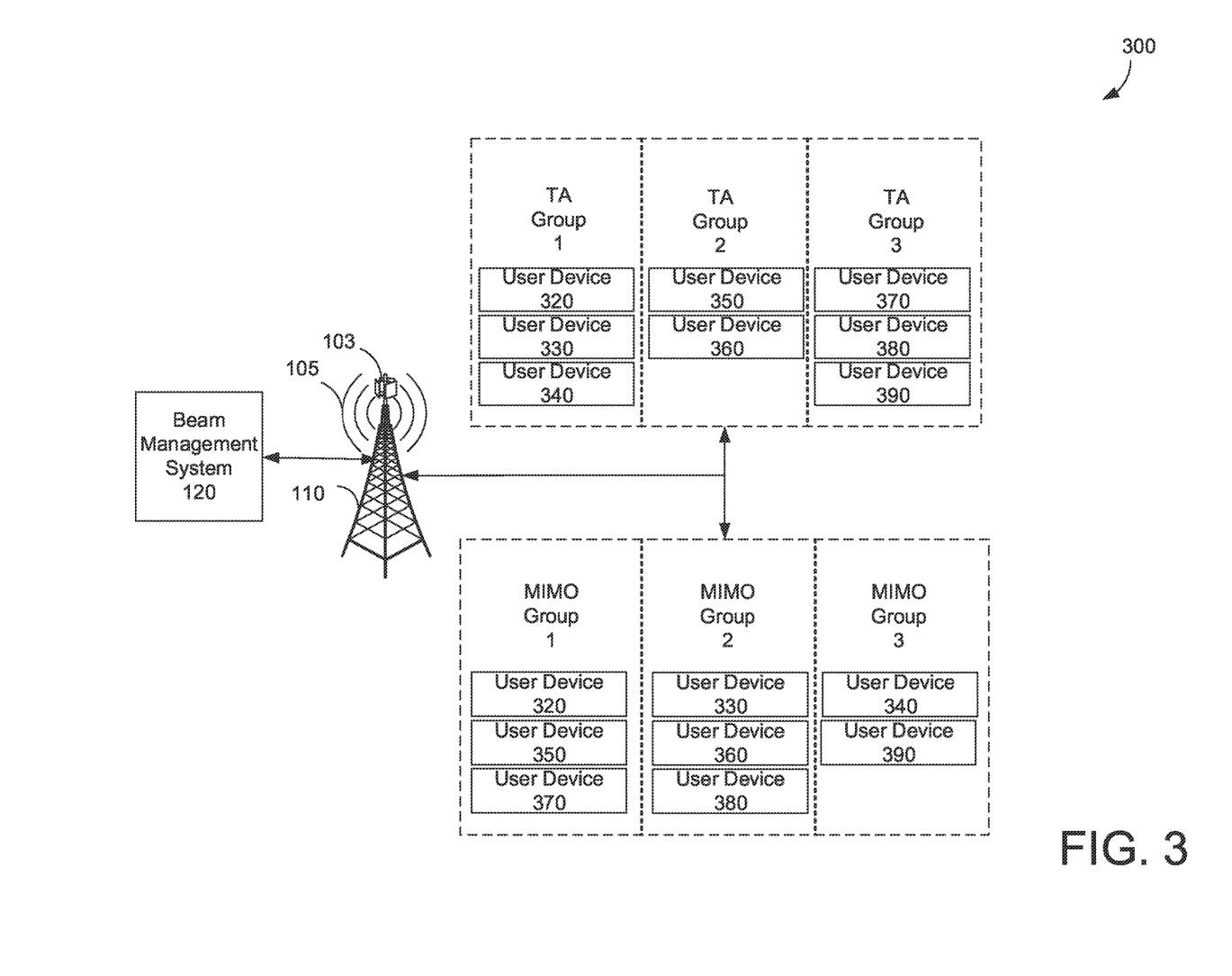
FIG. 3 is a diagram of a network environment including a plurality of time advance groups and MIMO groups in accordance with an example embodiment.

FIG. 3 is a diagram of the network environment 300 (e.g., a telecommunication network such as, but not limited to, a wireless telecommunication network) according to an example embodiment. In the present embodiment, the network environment 300 includes the antenna 103, beam 105, cell site 110, beam management system 120, user devices 320, 330, 340, 350, 360, 370, 380, and 390, time advance group 1, 2, and 3, and MIMO group 1, 2, and 3. Although some of the components in the network environment 300 are depicted as single components (e.g., a single antenna, cell site, or beam management system), in some embodiments, the network environment 300 may include a plurality of such components from 1 to N.

In some examples, the beam management system 120 may determine at least one time advance group (e.g., TA Group 1, TA Group 2, and TA Group 3) for the one or more user devices based on the stored plurality of time advances as described herein with reference to FIG. 2.

In some embodiments, a plurality of time advances and a plurality of cell identifiers may be stored by the beam management system 120 based on at least one time advance group. A time advance and/or a cell identifier may correspond to a user device such that the user device may be communicatively coupled to a time advance group and a cell identifier in which the time advance is stored. As depicted in FIG. 3, the user devices 320, 330, and 340 may be communicatively coupled to the TA Group 1. The user devices 350 and 360 may be communicatively coupled to the TA Group 2 and the user devices 370, 380, and 390 may be communicatively coupled to the TA Group 3.

In further embodiments, the beam management system 120 (e.g., the gNodeB) may prioritize or otherwise schedule one or more user devices communicatively coupled to one or more time advance groups. Accordingly, the beam management system 120 may prioritize pairing among user device(s) communicatively coupled to the time advance group(s) for multi-device transmission (e.g., multi-device MIMO transmission). As used herein the term "multi-device transmission" may be used to refer to a plurality of devices that share one or more resources such as, but not limited to, time, frequency, or any other suitable resource. In some embodiments, the beam management system 120 (e.g., gNodeB) may utilize the same time slot and/or the same frequency resources for data transmission to the user device(s). Advantageously, the multi-device MIMO transmission may result in, enable, or otherwise provide multi-user MIMO (MU-MIMO) by which multiple devices may receive a plurality of data streams simultaneously.

The multi-device transmission may be operable via a beam management system 120 (e.g., a gNodeB) communicatively coupled to an antenna (e.g., the antenna 103) structured for massive multiple-input and multiple-output (mMIMO). In this regard, the beam management system 120 may prioritize or otherwise schedule, for example, one or more user devices communicatively coupled to at least one time advance group. For example, the beam management system 120 may prioritize or otherwise schedule the user devices 320, 350, and 370 for communication via a MIMO group (e.g., the MIMO Group 1). Alternatively or additionally, the beam management system 120 may prioritize or otherwise schedule the user devices 330, 360, and 380 for communication via the MIMO Group 2. In further embodiments, the beam management system 120 may prioritize or otherwise schedule the user devices 340 and 390 for communication via the MIMO Group 3. The prioritization may be grouped according to a first in first out (FIFO) grouping, last in first out (LIFO) grouping, or any other suitable operable grouping. Advantageously, prioritizing the pairing among user device(s) communicatively coupled to the time advance group(s) for multi-device transmission (e.g., multi-device MIMO transmission) improves performance and network efficiencies.

The beam management system 120 may determine a beam mode (e.g., the beam mode 250) to selectively communicate with the one or more user devices communicatively coupled to at least one time advance group according to at least one multiple-input and multiple-output group. The beam management system 120 may activate the beam mode for communication with the user device(s) of at least one time advance group according to at least one multiple-input and multiple-output group. In this regard, the beam management system 120 may move the beam mode from an inactive beam state to an active beam state responsive to the determination of the beam mode structured to communicate with the user device(s) of at least one time advance group according to at least one multiple-input and multiple-output group. The beam management system 120 may activate the beam mode (e.g., the interference reduction mode, channel reciprocity mode, codebook mode, etc.) per user device of the time advance groups 1, 2, and 3 according to the multiple-input and multiple-output groups 1, 2, and 3 such that the user devices share one or more resources (e.g., time, frequency, etc.).

Figure 4:
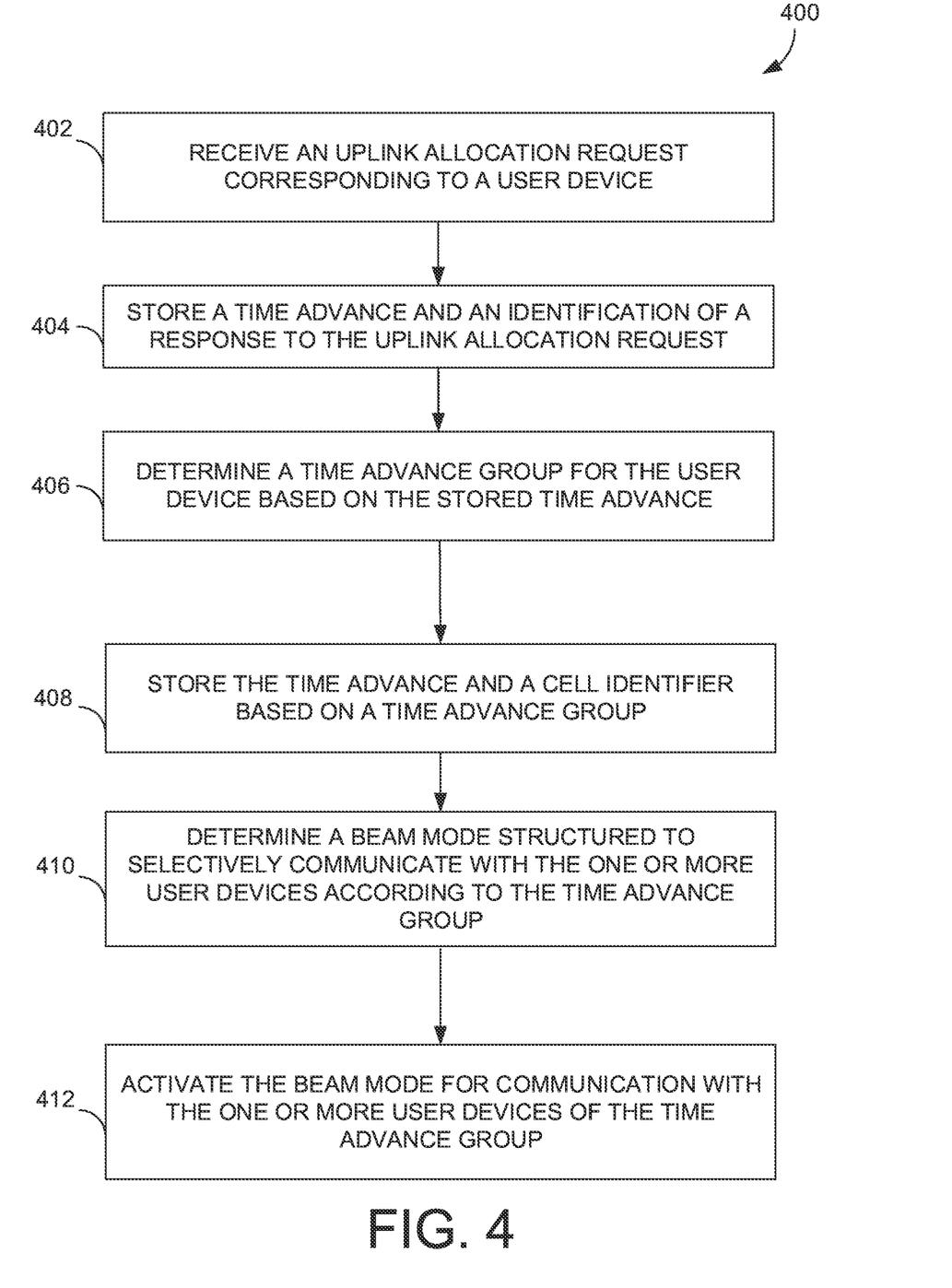
FIG. 4 depicts a flowchart of an exemplary method for controlling a beam emitted from at least one antenna at a cell site in accordance with an example embodiment.

FIG. 4 depicts a flow diagram of an exemplary method 400 for controlling a beam emitted from at least one antenna at a cell site, in accordance with implementations of the present disclosure. Initially at block 402 an uplink allocation request corresponding to a user device is received by a beam management system communicatively coupled to one or more user devices. The uplink allocation request may include a physical random access channel (PRACH) request or any other suitable request. In response to the user device(s) going from an idle state to an active state (e.g., a Radio Resource Control (RRC) active state), the user device(s) may send or otherwise provide the uplink allocation request to the beam management system. In turn, the beam management system may receive or otherwise retrieve the uplink allocation request from the user device(s).

At block 404, a time advance and an identification of a response to the uplink allocation request is stored by the beam management system. In some embodiments, a time advance group for the user device is determined based on the stored time advance at block 406. The time advance (TA) may include a distance between a user device(s) and a cell site. The identification of a response to the uplink allocation request may include a Random Access Radio Network Temporary Identifier (RA-RNTI) such that the beam management system may store the time advance and the identification of the response to the uplink allocation request in the downlink.

At block 408, the time advance and a cell identifier is stored based on the time advance group. The beam management system may replace the identification of the response to the uplink allocation request with a cell identifier (e.g., a Cell Radio Network Temporary Identifier (C-RNTI)). The cell identifier may include an identifier of the Radio Resource Control (RRC) Connection. Alternatively or additionally, the cell identifier may be utilized for scheduling the beam mode activation for the user device(s). The beam management system may store the TA and C-RNTI in, for example, memory or a scheduler (e.g., a scheduling unit and/or scheduling circuitry) based on the time advance group.

At block 410, a beam mode structured to selectively communicate with the one or more user devices according to the time advance group is determined. In this regard, the beam mode may include a channel reciprocity mode, codebook mode, interference reduction mode, or a combination thereof.

At block 412, the beam mode is activated for communication with the one or more user devices of the time advance group. The beam management system may move the beam mode from an inactive beam state to an active beam state to activate the beam mode for communication with the user device(s) of the time advance group. The activation of the beam mode may occur responsive to the determination of the beam mode structured to selectively communicate with the user device(s) of the time advance group. The beam management system may switch between the beam mode(s) (e.g., between the channel reciprocity mode, codebook mode, and/or interference reduction mode). In some embodiments, the beam mode may be activated for communication with one or more user devices simultaneously over a geographic area.

Figure 5:
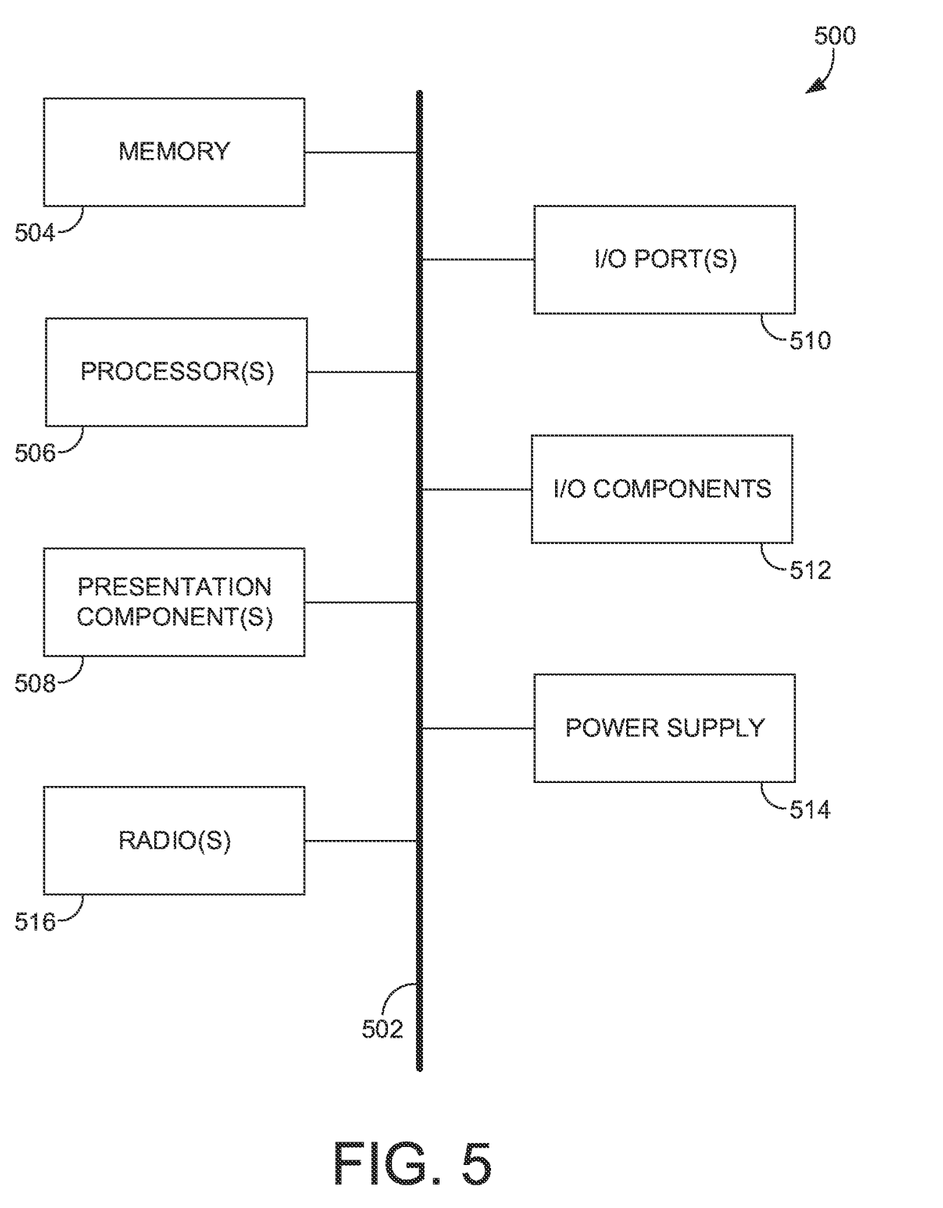
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunication network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 510 may be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method for controlling a beam emitted from at least one antenna at a cell site, the method comprising:
    receiving, by a beam management system communicatively coupled to one or more user devices, an uplink allocation request corresponding to a user device;
    storing a time advance and an identification of a response to the uplink allocation request, wherein the time advance corresponds to a distance between the user device and the cell site;
    determining a time advance group for the user device based on the stored time advance;
    storing the time advance and a cell identifier based on the time advance group;

determining a beam mode structured to selectively communicate with the one or more user devices according to the time advance group; and activating the beam mode for communication with the one or more user devices of the time advance group.

2. The method of claim 1, wherein the beam mode comprises at least one of a channel reciprocity mode, codebook mode, or interference reduction mode.

3. The method of claim 1, wherein the beam management system is structured to provide a time advance notification, and wherein the time advance notification comprises the time advance corresponding to the one or more user devices in response to the received uplink allocation request.

4. The method of claim 1, wherein the beam management system is structured to replace the identification of the response to the uplink allocation request with the cell identifier.

5. The method of claim 1, wherein the beam management system comprises a gNodeB, and wherein the gNodeB is communicatively coupled to an antenna structured for massive multiple-input and multiple-output (mMIMO).

6. The method of claim 1, wherein a plurality of time advances and a plurality of cell identifiers are stored based on a plurality of time advance groups.

7. The method of claim 1, wherein a plurality of beam modes are structured to selectively communicate with the one or more user devices according to a plurality of time advance groups.

8. The method of claim 1, wherein a telecommunications network comprises the cell site, and wherein the cell site is operable based on a 5G New Radio network.

9. The method of claim 8, wherein the cell site comprises the beam management system.

10. A non-transitory computer-readable storage media having computer-executable instructions embodied thereon that, when executed by one or more processors, cause the processors to:

receive, by a beam management system communicatively coupled to one or more user devices, an uplink allocation request corresponding to the one or more user devices;

store a plurality of time advances and a plurality of identifiers of responses to the uplink allocation request, wherein the plurality of time advances correspond to at least one distance between the one or more user devices and a cell site;

determine at least one time advance group for the one or more user devices based on the stored plurality of time advances;

store the plurality of time advances and a plurality of cell identifiers based on the at least one time advance group;

determine a beam mode structured to selectively communicate with the one or more user devices according to the at least one time advance group; and activate the beam mode for communication with the one or more user devices of the at least one time advance group.

11. The non-transitory computer-readable storage media of claim 10, wherein the beam mode comprises at least one of a channel reciprocity mode, codebook mode, or interference reduction mode.

12. The non-transitory computer-readable storage media of claim 10, wherein the beam management system comprises a gNodeB, and wherein the gNodeB is communicatively coupled to an antenna structured for massive multiple-input and multiple-output (mMIMO).

13. The non-transitory computer-readable storage media of claim 10, wherein the beam management system is structured to replace the plurality of identifiers of responses to the uplink allocation request with the plurality of cell identifiers.

14. The non-transitory computer-readable storage media of claim 10, wherein a plurality of beam modes are structured to selectively communicate with the one or more user devices according to the at least one time advance group.

15. The non-transitory computer-readable storage media of claim 10, wherein a telecommunications network comprises the cell site, wherein the cell site is operable based on a 5G New Radio network, and wherein the cell site comprises the beam management system.

16. A system for controlling a beam emitted from at least one antenna at a cell site, the system comprising:

a user device; and the cell site comprising a beam management system communicatively coupled to the user device, the cell site structured to:

receive, by the beam management system communicatively coupled to one or more user devices, an uplink allocation request corresponding to a user device;

store a time advance and an identification of a response to the uplink allocation request, wherein the time advance corresponds to a distance between the user device and the cell site;

determine a time advance group for the user device based on the stored time advance;

store the time advance and a cell identifier based on the time advance group;

determine a beam mode structured to selectively communicate with the one or more user devices according to the time advance group; and activate the beam mode for communication with the one or more user devices of the time advance group.

17. The system of claim 16, wherein the beam mode comprises at least one of a channel reciprocity mode, codebook mode, or interference reduction mode.

18. The system of claim 16, wherein the beam management system is structured to replace the identification of the response to the uplink allocation request with the cell identifier.

19. The system of claim 16, wherein the beam management system comprises a gNodeB, and wherein the gNodeB is communicatively coupled to an antenna structured for massive multiple-input and multiple-output (mMIMO).

20. The system of claim 16, wherein the cell identifier comprises a Cell Radio Network Temporary Identifier (C-RNTI).

* * * * *